(12) United States Patent  (10) Patent No.: US 8,954,120 B2
Yoo et al.  (45) Date of Patent: Feb. 10, 2015

(54) CRADLING APPARATUS FOR PORTABLE COMMUNICATION DEVICE

(75) Inventors: Chung-Keun Yoo, Gyeonggi-do (KR); Yun-Cheol Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 58 days.

(21) Appl. No.: 13/339,435

(22) Filed: Dec. 29, 2011

(65) Prior Publication Data

US 2012/0178508 A1 Jul. 12, 2012

(30) Foreign Application Priority Data

Jan. 10, 2011 (KR) .......................... 10-2011-0002480

(51) Int. Cl.
*H04M 1/00* (2006.01)
*H04M 1/02* (2006.01)

(52) U.S. Cl.
CPC .......... *H04M 1/0237* (2013.01); *H04M 1/0216* (2013.01)
USPC .................. 455/575.4; 455/571.1; 455/575.3; 379/433.11; 379/433.12; 379/433.13

(58) Field of Classification Search
USPC ................ 455/575.1, 575.3, 575.4; 379/433.11–433.13
See application file for complete search history.

(56) References Cited

U.S. PATENT DOCUMENTS

| 5,933,330 | A * | 8/1999 | Beutler et al. ................. 361/814 |
| 6,539,208 | B1 * | 3/2003 | Mori ........................... 455/575.3 |
| 7,426,406 | B2 * | 9/2008 | Maatta et al. ............... 455/575.8 |
| 7,489,920 | B2 * | 2/2009 | Kim ............................... 455/411 |
| 8,249,676 | B2 * | 8/2012 | Ladouceur et al. ......... 455/575.4 |
| 8,315,044 | B2 * | 11/2012 | Wu et al. .................... 361/679.02 |
| 8,363,391 | B2 * | 1/2013 | Kim et al. ................. 361/679.01 |
| 8,548,541 | B2 * | 10/2013 | Rayner ....................... 455/575.8 |
| 2005/0107137 | A1 * | 5/2005 | Byun et al. ................. 455/575.1 |
| 2006/0128190 | A1 | 6/2006 | Kato |
| 2007/0183123 | A1 | 8/2007 | Chuan et al. |
| 2008/0085747 | A1 * | 4/2008 | Lee ............................. 455/575.7 |
| 2009/0280874 | A1 * | 11/2009 | Kosugi et al. .............. 455/575.3 |
| 2010/0210311 | A1 * | 8/2010 | Ahn et al. ...................... 455/566 |
| 2010/0323772 | A1 * | 12/2010 | Kiryu et al. ................ 455/575.4 |
| 2011/0130178 | A1 * | 6/2011 | Shin et al. .................. 455/575.4 |

FOREIGN PATENT DOCUMENTS

| EP | 1 777 923 A1 | 4/2007 | |
| EP | 1 843 559 A1 | 10/2007 | |
| KR | 10-0713411 B1 | 4/2007 | |
| WO | 2007/114584 A1 | 10/2007 | |
| WO | 2009/038375 A2 | 3/2009 | |
| WO | WO 2009038375 A2 * | 3/2009 | ............... H04B 1/38 |

* cited by examiner

*Primary Examiner* — Mehmood B Khan
(74) *Attorney, Agent, or Firm* — Cha & Reiter, LLC.

(57) ABSTRACT

Provided is a cradling apparatus for a portable communication device to allow the portable communication device to slide and be inclinedly cradled through pressurization. To this end, a cradling apparatus for a portable communication device includes a first housing, a second housing, and link portions provided between the first housing and the second housing to slide and inclinedly cradle the second housing. The apparatus further includes guide portions coupled to both sides of the first housing, guide members slidably coupled with the guide portions, hinge portions protruding from the guide members, the hinge portions being rotatably coupled with the second housing, and pressurizing portions provided on one ends of the hinge portions to pressurize the hinge portions and the guide members.

10 Claims, 16 Drawing Sheets

CRADLING APPARATUS FOR PORTABLE COMMUNICATION DEVICE

CLAIM OF PRIORITY

This application claims the benefit under 35 U.S.C. §119 (a) of a Korean Patent Application filed in the Korean Intellectual Property Office on Jan. 10, 2011 and assigned Serial No. 10-2011-0002480, the entire disclosure of which is hereby incorporated by reference.

BACKGROUND OF THE INVENTION

1. Field of the Invention

The present invention relates to a cradling apparatus for a portable communication device which enables the portable device to slide open and cradled.

2. Description of the Related Art

Generally, portable communication devices enable wireless communication while the devices are being carried. The portable communication type devices include a hand-held phone (HHP), a cordless telephone (CT)-2 cellular phone, a digital phone, a personal communications systems (PCS) phone, and a personal digital assistant (PDA) and are classified into various types, i.e., bar type, a flip type, a folder type, and a sliding type, according to their appearances.

However, in the conventional portable communication devices, a separately detached cradling apparatus is used for viewing information displayed on a display device, which may be uneconomical for a user. Typically, when the information displayed on the display device faces the user with an inclination, the user can conveniently view the displayed information. As such, when a separate cradling apparatus is not provided, a user can incline a main body with the hand for viewing. However, the user inevitably experiences discomfort in viewing the screen displayed on the display device because of absence of the separate cradling apparatus on the desk or the like.

To solve the foregoing problems, Korean Patent Registration No. 0713411 proposes a portable communication device cradle. As shown in FIGS. 1 through 3, the known portable communication device 10 includes a first housing 20, a second housing 30, a guide means 40, and a link portion 50. The first housing 20 extends along a longitudinal direction to face the second housing 30. The second housing 30 is provided on a top surface of the first housing 20, so that it can slide in perpendicular to the longitudinal direction and rotate to stand at a predetermined angle. The guide means 40 is provided at both end portions of the first housing 20 to guide sliding of the second housing 30. The link portion 50 is provided between the first housing 20 and the third housing 30 to rotate the second housing 30 to stand at a predetermined angle.

As shown in FIGS. 2 and 3, the guide means 40 includes a pair of guide members 41 and a pair of guide holes 42. The guide members 41 are formed at both end portions of the second housing 30 to slidably move in the guide holes 42. The guide holes 42 are provided in perpendicular to the longitudinal direction of the first housing 20 to be coupled with the guide members 41, such that the guide members 41 can slide and rotate around a rotation axis A1.

The guide members 41 are in a cylindrical shape, and the guide holes 42 are in the form of guide rails. However, since the conventional portable communication device which can be cradled has no component for pressurizing the guide members, the guide members are easily separated from the guide holes when a product is dropped.

Moreover, the cylindrical guide members are coupled to the guide holes through line contact rather than surface contact. As a result, coupling between the guide members and the guide holes is degraded, thus the guide members can be separated from the guide holes or damaged from an accidental drop.

To solve the aforementioned problems, a portable communication device has been developed in which a housing is cradled using a lever having no guide hole and an auxiliary lever.

As shown in FIGS. 4 through 6, a portable communication device 1 includes a first housing 2, a second housing 3, and a lever 4 and an auxiliary lever 5 provided on both sides of the first housing 2 and the second housing 3. The lever 4 and the auxiliary lever 5 rotate in a coordinated way during sliding of the second housing 3, and a space A1 is formed as the first housing 2 and the second housing 3 moves away from each other. In this state, the second housing 3 is cradled.

However, as shown in FIG. 5, in the portable communication device using the lever and the auxiliary lever, the space A1 has to be separated formed between the first housing 2 and the second housing 3 by the auxiliary lever during sliding and cradling of the second housing 3.

Therefore, in the former known art, to improve sliding and cradling of the portable communication device, there is a need for preventing the guide members from being separated from the guide holes in case the portable communication device is accidently dropped or for sliding and inclinedly cradling the portable communication device through surface contact rather than line contact.

In the latter known art, there is a need for a device for reducing sliding and cradling operations of a product by preventing the space from being formed between the first housing and the second housing during sliding and cradling of the portable communication device.

SUMMARY OF THE INVENTION

Accordingly, an aspect of the present invention is to provide a cradling apparatus for a portable communication device in which a pressurizing portion for pressuring a hinge portion and a guide member are provided to improve sliding and cradling operations and to prevent separation and damage of the product in case of drop, thereby improving the reliability and usability of the device.

Another aspect of the present invention is to provide a cradling apparatus for a portable communication device in which the portable communication device slides and is inclinedly cradled through surface contact rather than surface contact which in turn keeps the device together in case of an accidental drop.

Moreover, another aspect of the present invention is to provide a cradling apparatus for a portable communication device in which a guide movement portion for keeping a first housing and a second housing facing each other during sliding and cradling is provided to prevent a space from being formed in use of an auxiliary lever, thereby reducing sliding and cradling operations and thus improving the usability of the product.

Furthermore, another aspect of the present invention is to provide a cradling apparatus for a portable communication device in which a variable auxiliary lever for keeping a first housing and a second housing facing each other according to variable movement is provided to prevent a space from being formed in use of an auxiliary lever, thereby reducing sliding and cradling operations and thus improving the usability of the product.

In addition, another aspect of the present invention is to provide a cradling apparatus for a portable communication device in which a hinge module for automatically sliding a second housing by a predetermined distance and cradling the second housing is provided, thereby further improving the workability and usability of a product.

According to an aspect of the present invention, a cradling apparatus for a portable communication device includes a first housing, a second housing, and link portions provided between the first housing and the second housing to slide and inclinedly cradle the second housing, the cradling apparatus including guide portions coupled to both sides of the first housing, guide members slidably coupled with the guide portions, hinge portions protruding from the guide members, the hinge portions being rotatably coupled with the second housing, and pressurizing portions provided at one ends of the hinge portions to pressurize the hinge portions and the guide members.

According to another aspect of the present invention, a cradling apparatus for a portable communication device includes a first housing, a second housing, and link portions provided between the first housing and the second housing to slide and inclinedly cradle the second housing, the cradling apparatus including an auxiliary lever provided between the first housing and the second housing, a guide movement portion formed in the second housing and rotatably and movably coupled with the auxiliary lever to keep the first housing and the second housing facing each other, and a lever elastic member provided in the auxiliary lever to provide an elastic force to the auxiliary lever for allowing the auxiliary lever to rotate and move in the guide movement portion.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE INVENTION

Figure 1:
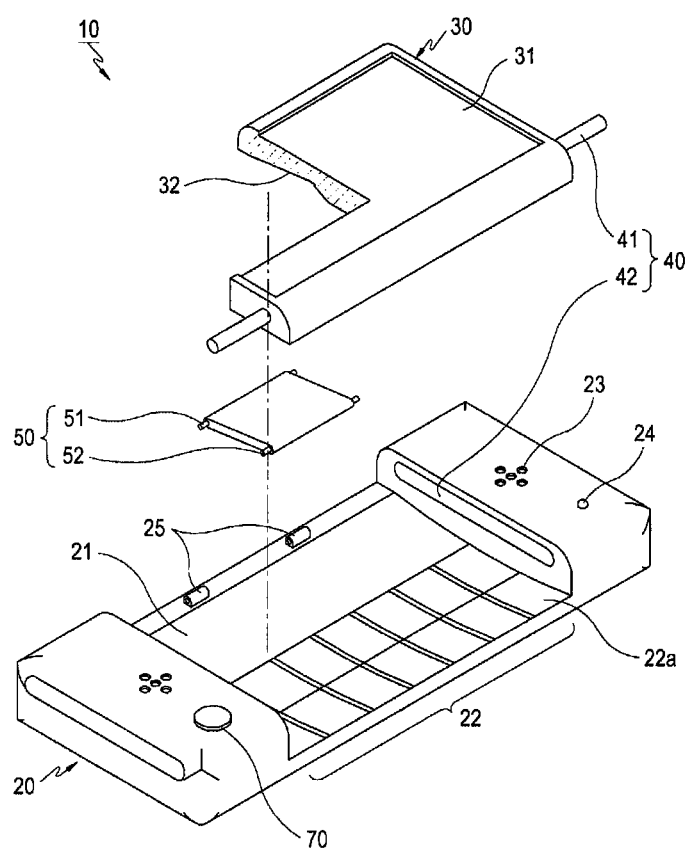
FIG. 1 is an exploded perspective view of a cradling apparatus for a conventional portable communication device.
Figure 2:
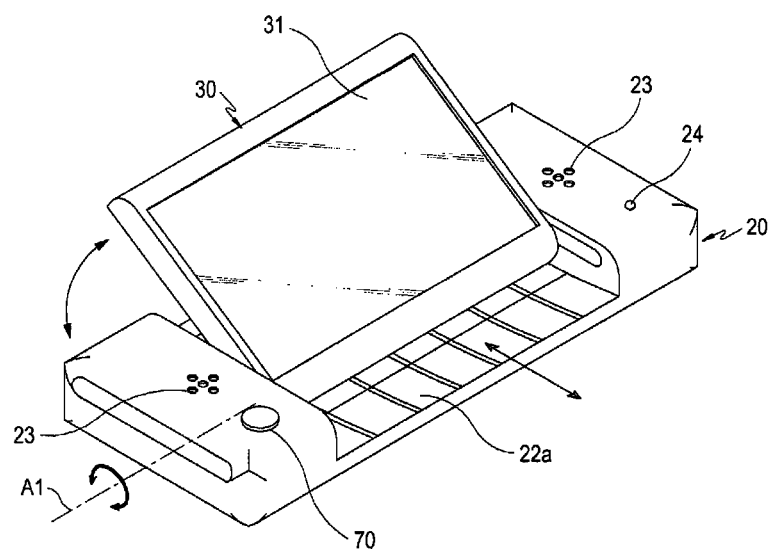
FIG. 2 is a perspective view showing an operation state of a cradling apparatus for a conventional portable communication device.
Figure 3:
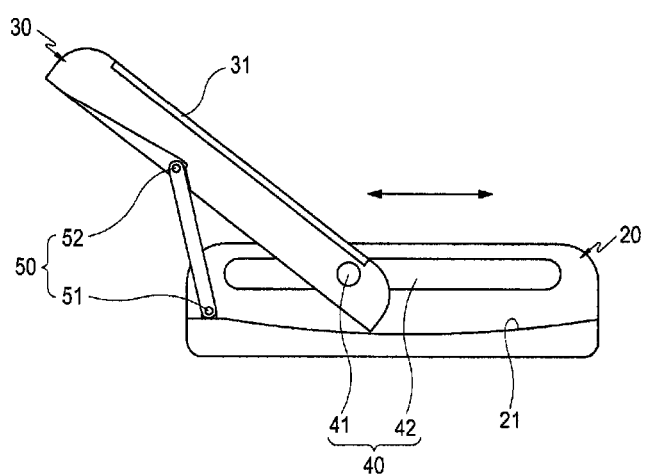
FIG. 3 is a side cross-sectional view showing an operation state of a cradling apparatus for a conventional portable communication device.
Figure 4:
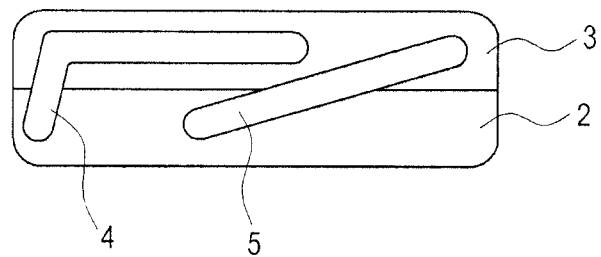
FIG. 4 is a side cross-sectional view showing a pre-operation (before-operation) state of a cradling apparatus for a conventional portable communication device.
Figure 5:
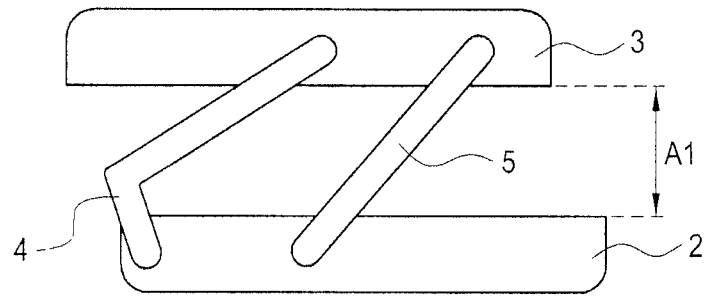
FIG. 5 is a side cross-sectional view showing an operation process of a cradling apparatus for a conventional portable communication device shown in FIG. 4.
Figure 6:
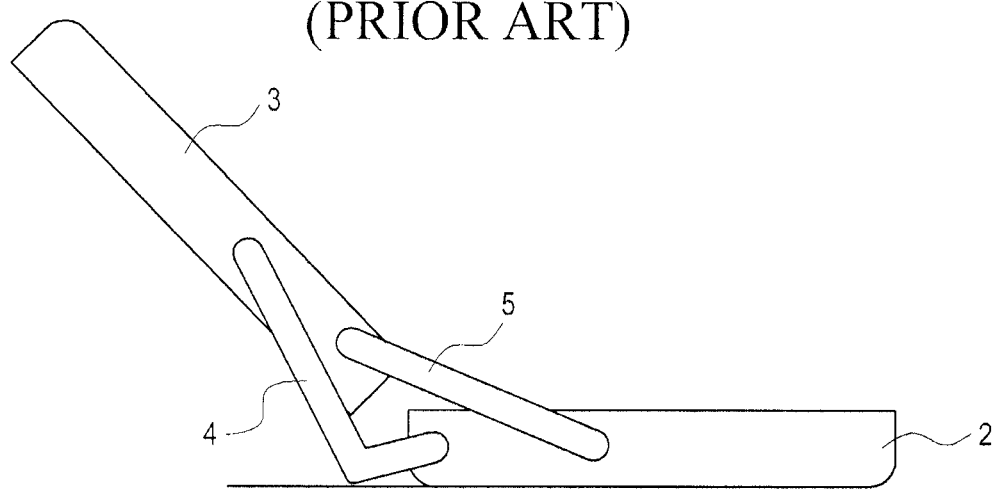
FIG. 6 is a side cross-sectional view showing a post-operation (after-operation) state of a cradling apparatus for a conventional portable communication device shown in FIG. 4.

Hereinafter, exemplary embodiments of the present invention will be described in detail with reference to the accompanying drawings. The embodiments disclosed in the specification and structures shown in the drawings are merely exemplary ones of the present invention, and it should be understood that various variations capable of substituting for the embodiments may exist at the time of filing the application.

As shown in FIGS. 7 through 13, a cradling apparatus 100 for a portable communication device includes a first housing 110 in which an open/closed region 112 is formed to be recessed to a predetermined depth, a second housing 120 including a display unit 121, link portions 130, guide portions 140, guide members 150, hinge portions 160, and pressurizing portions 180. The first housing 110 allows the second housing 120 to slide and be cradled. The second housing 120 is provided on a top surface of the first housing 110 to slide and be cradled inclinedly while facing the first housing 110. The link portions 130 are provided between the first housing 110 and the second housing 120 to open or close the open/closed region 112 when the second housing 120 slides and is cradled inclinedly. The guide portions 140 are coupled to both ends of the first housing 110 to be slidably coupled with the guide members 150. The guide members 150 are slidably coupled with the guide portions 140, and the hinge portions 160 protrude from sides of the guide members 150 to be rotatably coupled with the second housing 120, and the pressurizing portions 180 are provided on end portions of the hinge modules 160 to prevent the hinge portions 160 and the guide members 150 from leaving the guide portions 140 by pressurizing the hinge portions 160 and the guide members 150.

The guide members 150 are coupled to the guide portions 140 through surface contact.

Figure 7:
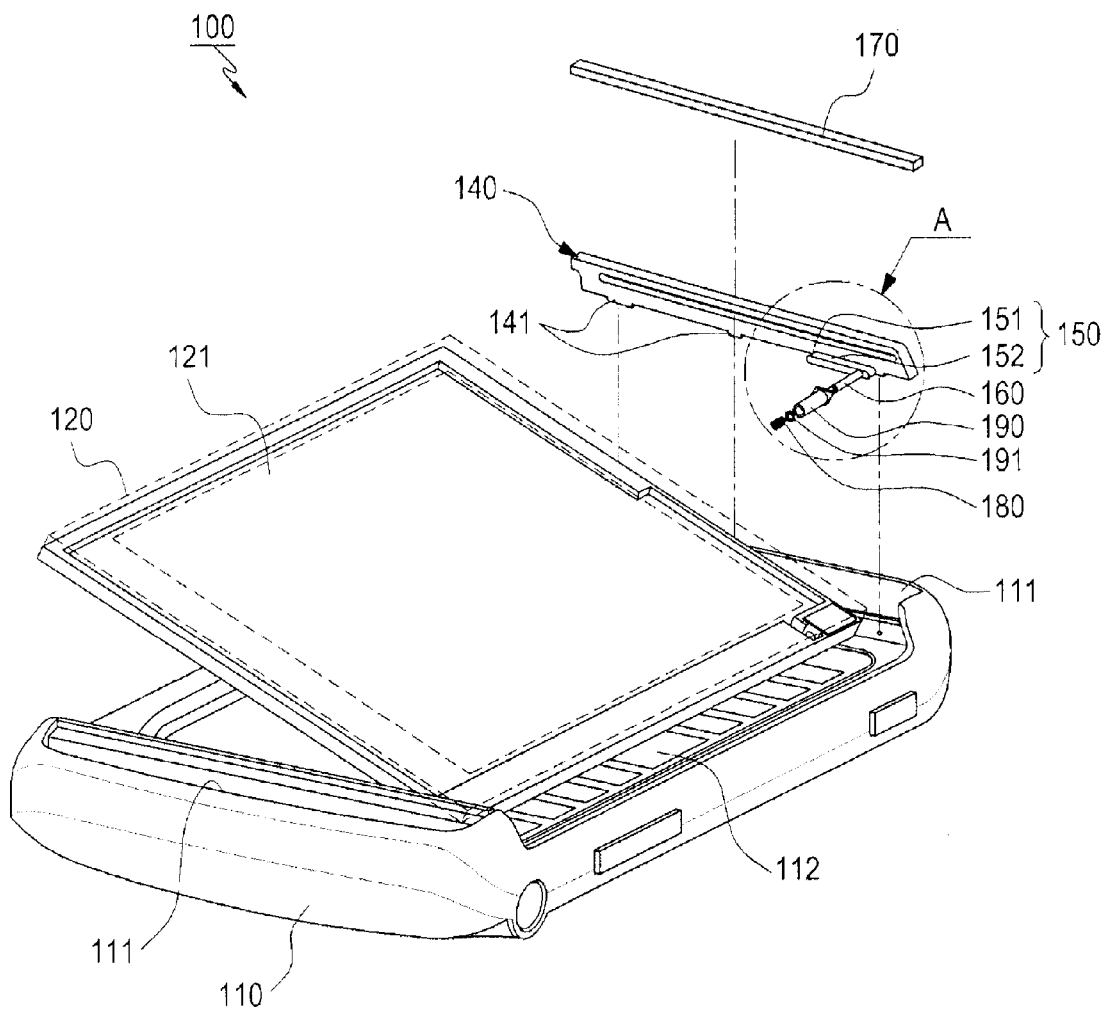
FIG. 7 is an exploded perspective view of a cradling apparatus for a portable communication device according to a first embodiment of the present invention.

As shown in FIG. 7, on both ends of the first housing 110 are formed sitting portions 111 for sitting thereon the guide portions 140 which include guide rails in which at least one screw engagement portions 141 are formed to be engaged with the first housing 110 by means of screw (not shown).

As shown in FIGS. 7, 9, 10, 12, and 13, on the guide portions 140 are provided protection cover portions 170 for protecting the guide portions 140.

As shown in FIGS. 7 through 10, the guide members 150 are of a long bar type, and both end portions of the guide members 150 are in hemispheric shapes. In center portions of the guide members 150 are formed surface-contact portions 152 for surface-contacting the guide portions 140.

As shown in FIGS. 7 through 10, the pressurizing portions 180 include coil springs and the hinge portions 160 are provided with bushes 190 which are coupled to a hinge housing 122 formed in the second housing 120 and are rotatably coupled with the hinge portions 160 to support rotation of the hinge portions 160. To one end portions of the hinge portions 160 are engaged E-rings 191 for preventing separation of the bushes 190.

Figure 10:
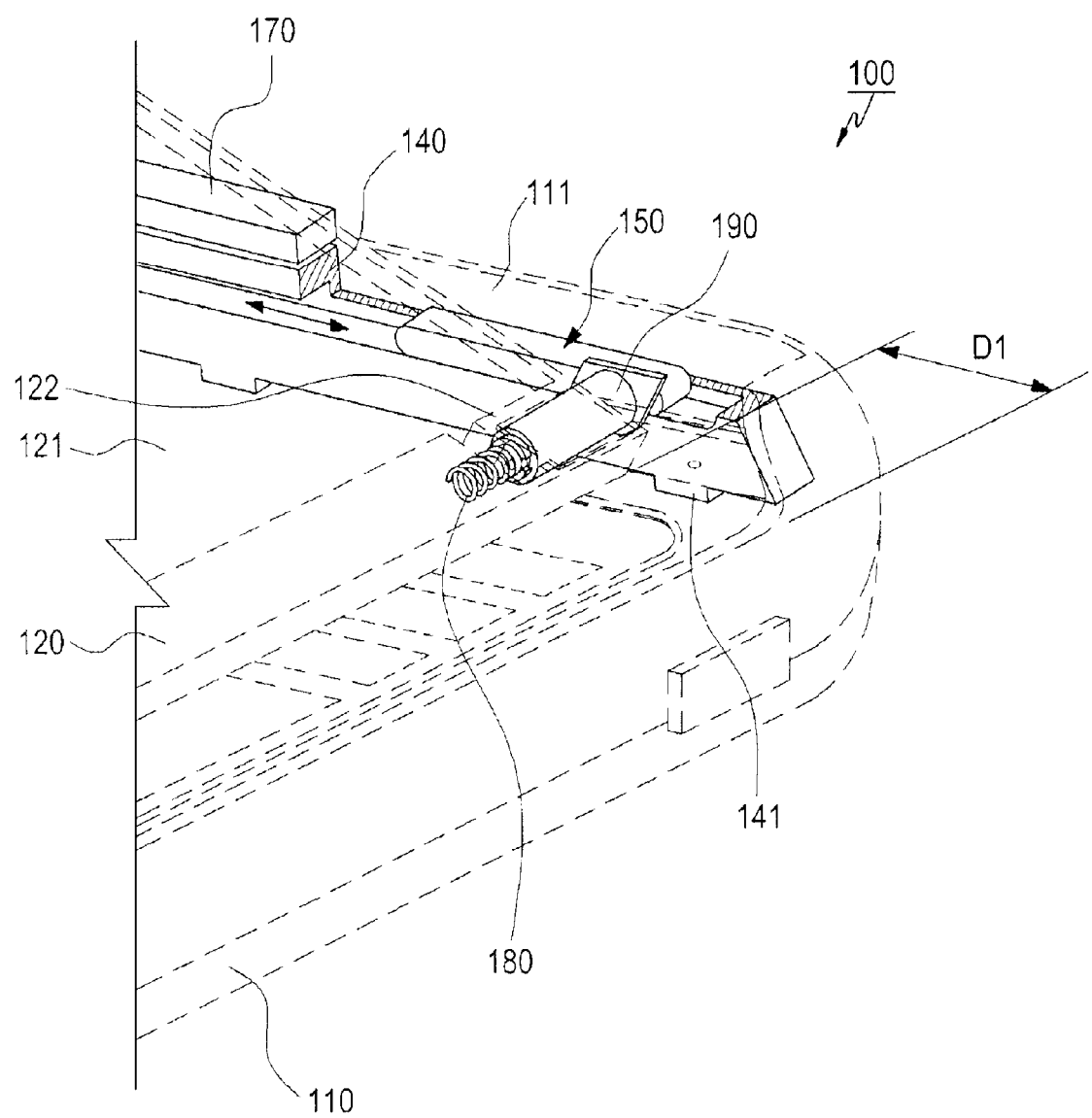
FIG. 10 is a perspective view showing an assembled state of a cradling apparatus for a portable communication device according to a first embodiment of the present invention.
Figure 11:
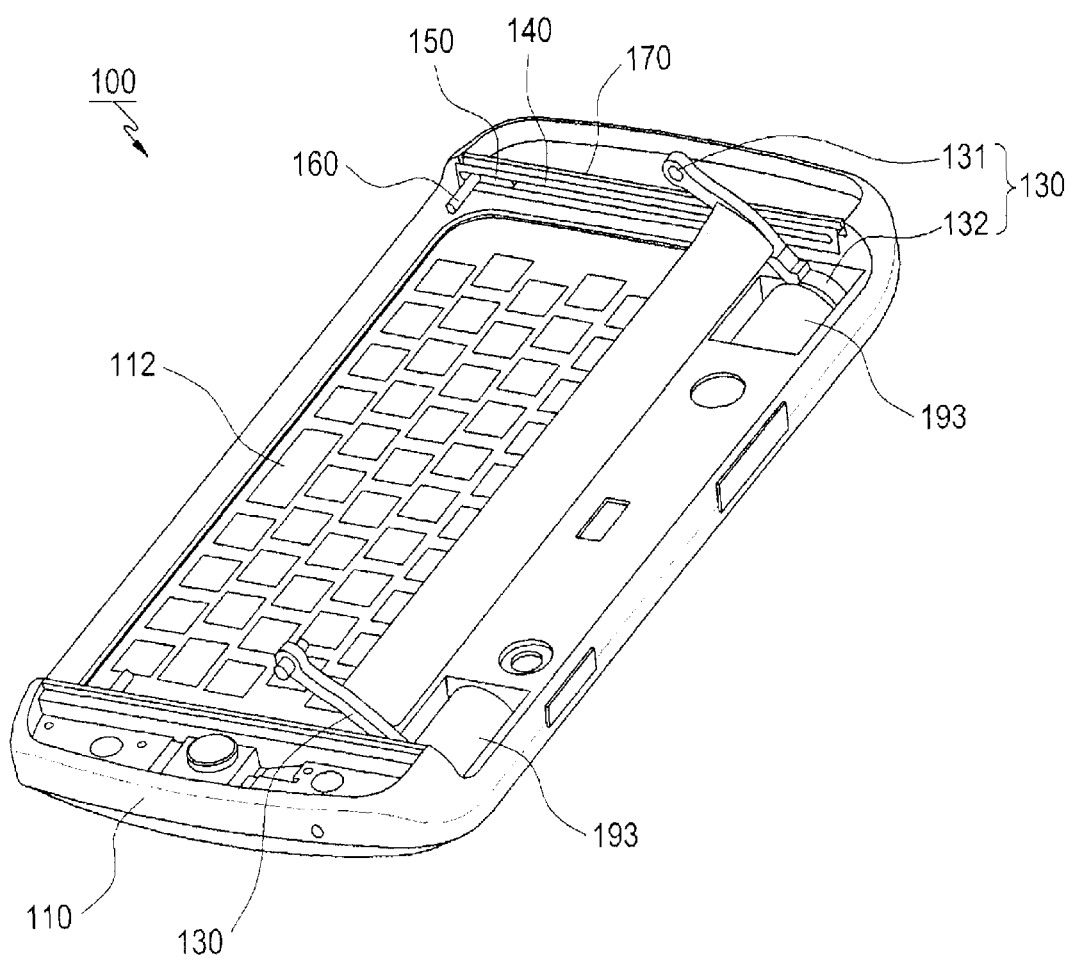
FIG. 11 is a perspective view showing a coupled state between a guide member and a link portion in a cradling apparatus for a portable communication device according to a first embodiment of the present invention.

As shown in FIGS. 10 and 11, in one end portions of the link portions 130 are formed rotation holes to be rotatably coupled with rotation coupling portions (not shown) provided in the second housing 120, and in another end portions thereof are formed hinge coupling portions 132 which are coupled with rotation portions (not shown) provided in hinge modules 193 and rotate together with the rotation portions.

Figure 13:
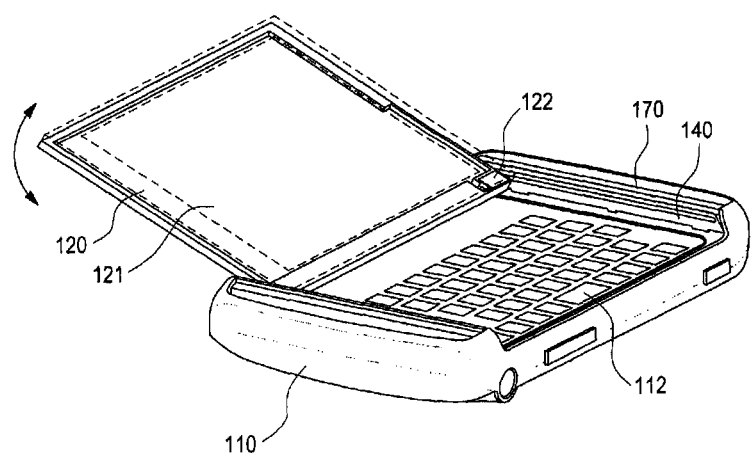
FIG. 13 is a perspective view showing a post-operation (after-operation) state of a cradling apparatus for a portable communication device according to a first embodiment of the present invention.

As shown in FIGS. 11 and 13, the hinge modules 193 provide a force for allowing the second housing 120 to automatically slide and be inclinedly cradled while facing the first housing 110 when the second housing 120 slides by a predetermined distance.

As shown in FIG. 10, a predetermined distance D1 for the second housing 120 is about 4-5 mm from the first housing 110.

The hinge modules 193 include hinge cams, hinge shafts, and coil springs. The hinge cams include the rotation portions (not shown) to be coupled with the hinge coupling portions 132. On surfaces of the hinge cams are formed female thread portions including curved surfaces to correspond to male thread portions of the hinge shafts. On one end portions of the hinge shafts are formed the male thread portions including curved surfaces to face the curved surfaces of the female thread portions, such that the rotation portions are rotated by slide-contact between the male thread portions and the female thread portions. The coil springs pressurize another end portions of the hinge shafts such that the curved surfaces of the male thread portions and the female thread portions can slide and contact and one end portions of the coil springs linearly move together with the hinge shafts. Herein, the hinge cams, the hinge shafts, and the coil springs are not shown.

On the open/closed region 112 of the first housing 110 are formed at least one of input/output devices, a speaker device, a microphone device, a camera module, and a battery pack. The input/output devices include at least one of a display unit, a touch screen, a keypad, and a keyboard, a navigation key, QWERTY keys, keys dedicated to games, etc.

The second housing 120 includes at least one of the display unit 121, a touch screen, a speaker device, a microphone device, and a camera module. Herein, the touch screen, the speaker device, the microphone device, and the camera module are not shown.

Although the portable communication device has been used as a representative application example for the cradling apparatus according to an embodiment of the present invention, it should be noted that the teachings of the present invention may be applied to various types of terminals without being limited to a mobile communication terminal, for example, a bar-type terminal, a folder-type terminal, a sliding-type terminal, a swing-type terminal, and so forth.

Examples of the portable communication device according to an embodiment of the present invention may include not only mobile communication terminals operating according to communication protocols corresponding to various communication systems, but also any information communication apparatuses and multimedia apparatuses such as Portable Multimedia Players (PMPs), MP3 players, game players, notebooks, advertisement boards, TVs, digital broadcasting players, Personal Digital Assistants (PDAs), and smart phones, and so forth, and their application apparatuses.

With reference to FIGS. 7 through 13, a detailed description will be made of an operation process of the cradling apparatus for the portable communication device according to the first embodiment of the present invention.

As shown in FIGS. 7 through 13, the cradling apparatus 100 for the portable communication device includes the first housing 110 where the open/closed region 112 is formed to be recessed to a predetermined depth, the second housing 120 including the display unit 121, the link portions 130, the guide portions 140, the guide members 150, the hinge portions 160, and the pressurizing portions 180.

As shown in FIG. 7, the guide portions 140 are sit on the sitting portions 111 formed on both sides of the first housing 110, and in this state, screws are engaged to at least one screw engagement portions 141 formed on the guide portions 140, thereby fixing the guide portions 140 to the both sides of the housing 110.

As shown in FIGS. 7, 9, 12, and 13, the protection cover portions 170 provided over the guide portions 140 for protection.

Figure 8:
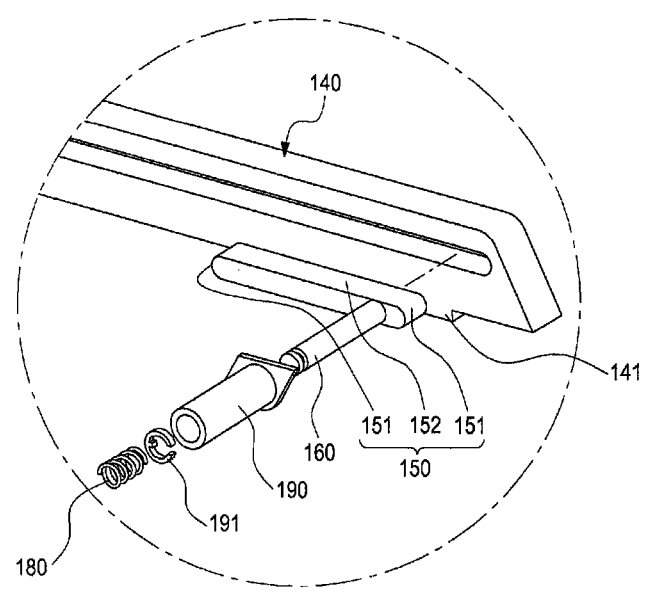
FIG. 8 is an enlarged exploded perspective view of a portion A of FIG. 7.
Figure 9:
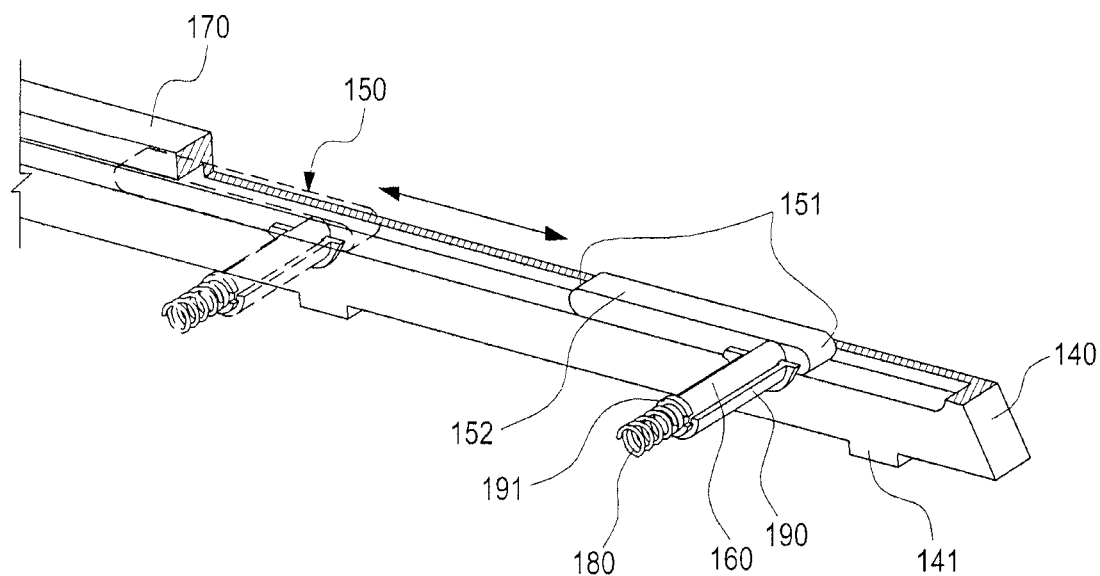
FIG. 9 is a perspective view showing a coupled state between a guide portion and a guide member in a cradling apparatus for a portable communication device according to a first embodiment of the present invention.

In this state, as shown in FIGS. 7 through 9, the guide members 150 are coupled to the guide portions 140, such that the guide members 150 surface-contact the guide portions 140 and slide.

As shown in FIGS. 7 and 8, the bushes 190 and the pressurizing portions 180 are coupled in the hinge housing 122 formed in the second housing 120, and the hinge housing 122 is rotatably coupled to the hinge portions 160 protruding from sides of the guide members 150. The bushes 190 are coupled with the hinge portions 160 by passing the hinge portions 160 therethrough. One end portions of the hinge portions 160 are pressurized outwardly by the pressurizing portions 180. The same end of the hinge portions 160 are engaged the E-rings 191 for preventing separation of the bushes 190.

As shown in FIGS. 7 and 8, the pressurizing portions 180 include coil springs.

In this state, as shown in FIGS. 10 and 13, to slide and cradle the second housing 120 while keeping the second housing 120 facing the first housing 110, a user slides the second housing 120 by about 4-5 mm which causes the second housing 120 to rotate for cradling.

As shown in FIGS. 9 and 10, the guide members 150 also slide together with the second housing 120. At this time, surface-contact portions 152 of the guide members 150 slide while surface-contacting the guide portions 140. In this case, the guide members 150 slide while being pressurized outwardly by the pressurizing portions 180.

The hinge portions 160 protruding from the guide members 150 enable rotation of the second hinge housing 120.

As shown in FIGS. 10, 11, and 13, the hinge modules 193 provided at another end portions of the link portions 130 provide a force for automatically sliding and inclinedly cradling the second housing 120 while keeping the second housing 120 facing the first housing 110 when the second housing 120 slides by a distance of 4-5 mm.

The hinge modules 193 rotate one end portions of the link portions 130 together with rotation of the link portions 130 to automatically slide and inclinedly cradle the second housing 120.

At this time, as shown in FIGS. 9 and 10, the guide members 150, together with the second housing 120, also slide by surface-contacting the guide portions 140, and the guide members 150 and the hinge portions 160 slide while being pressurized by the pressurizing portions 180. The hinge portions 160 rotate the second housing 120 to slide and cradle the second housing 120.

Figure 12:
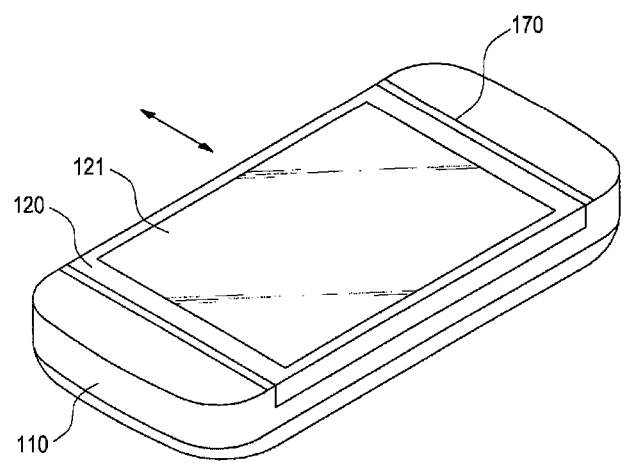
FIG. 12 is a perspective view showing a pre-operation (before-operation) state of a cradling apparatus for a portable communication device according to a first embodiment of the present invention.

In this state, as shown in FIG. 12, to turn the second housing 120 to the original position, the user rotates and slides the second housing 120 while keeping the second housing 120 facing the first housing 110.

As shown in FIGS. 9 and 10, the guide members 150, together with the second housing 120, slide while surface-contacting the guide portions 140 and while being pressurized by the pressurizing portions 180. The link portions 130 also rotate and the hinge modules 193 also rotate, such that the second housing 120 is turn to the original position.

As such, the guide members 150 surface-contact, rather than line-contact, the guide portions 140, and are pressurized outwardly together with the hinge portions 160 by the pressurizing portions 180, thereby preventing separation from the first housing 110 and damage of a product in case of an accidental drop which in turn improves the sliding and cradling operations over the prior art.

With reference to FIGS. 14 through 20, a detailed description will now be made of an operation process of a cradling apparatus for a portable communication device according to a second embodiment of the present invention.

As shown in FIGS. 14 through 18, a cradling apparatus 200 for a portable communication device includes the first housing 110 where the open/closed region 112 is formed to be recessed to a predetermined depth, the second housing 120 including the display unit 121, the link portions 130, an auxiliary lever 210, a guide movement portion 220, and a lever elastic member 230. The first housing 110 allows the second housing 120 to slide and be cradled. The second housing 120 is provided on a top surface of the first housing 110 to slide and be cradled inclinedly while facing the first housing 110. The link portions 130 are provided between the first housing 110 and the second housing 120 to open or close the open/closed region 112 when the second housing 120 slides and is cradled inclinedly. The auxiliary lever 210 is provided between the first housing 110 and the second housing 120, such that the auxiliary lever 210 supports the second housing 120 to keep the second housing 120 facing the first housing 110. The guide movement portion 220 is formed in the second housing 120 to be rotatably and movably coupled with the auxiliary levers 210 and to keep the first housing 110 and the second housing 120 facing each other. The lever elastic member 230 is provided in the auxiliary lever 210, such that the lever elastic member 230 provides an elastic force to the auxiliary lever 210 for allowing the auxiliary lever 210 to rotate and move in the guide movement portion 220.

As shown in FIGS. 15 through 18, on one end portion of the auxiliary lever 210 is provided a first rotation portion 211 to be rotatably coupled with the first housing 110, and at another end portion thereof is provided a second rotation portion 212 to be rotatably and movably coupled with the guide movement portion 220.

Figure 15:
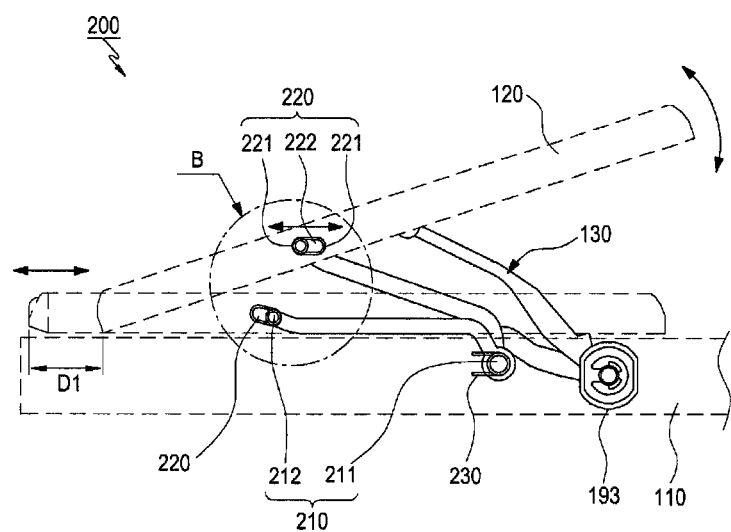
FIG. 15 is a side view of a cradling apparatus for a portable communication device according to a second embodiment of the present invention.
Figure 16:
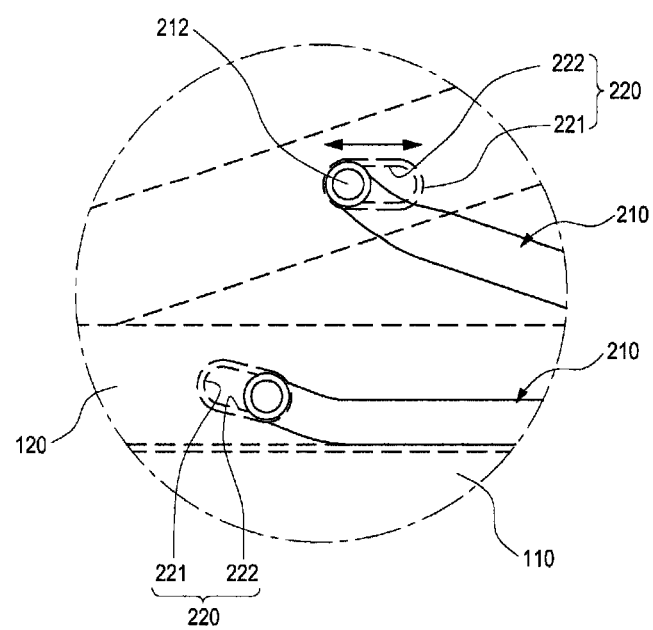
FIG. 16 is an enlarged side cross-sectional view of a portion B of FIG. 15.

As shown in FIGS. 15 and 16, the guide movement portion 220 includes a long hole, wherein the guide movement portion 220 has contact grooves 221 in a hemispheric shape in both end portions thereof and has in a center portion thereof a movement hole 222 for allowing the second rotation portion 212 of the auxiliary lever 210 to move therein.

Figure 17:
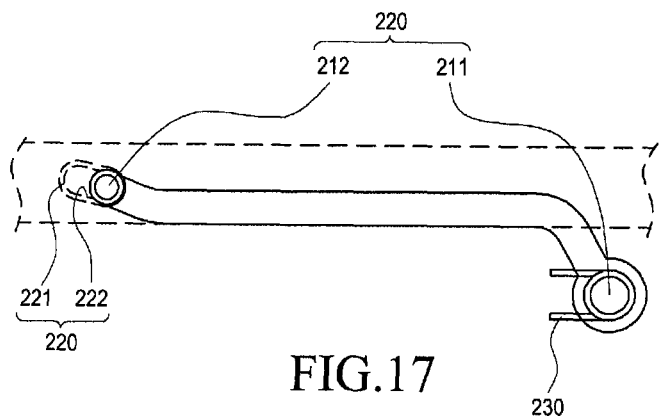
FIG. 17 is a side view showing an assembled state of a cradling apparatus for a portable communication device according to a second embodiment of the present invention.

As shown in FIG. 17, the lever elastic member 230 includes a wire spring.

Figure 19:
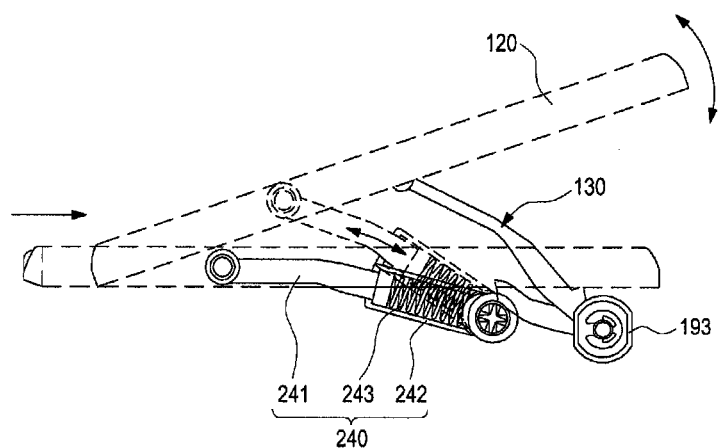
FIG. 19 is a side cross-sectional view showing another example of an auxiliary lever in a cradling apparatus for a portable communication device according to a second embodiment of the present invention.
Figure 20:
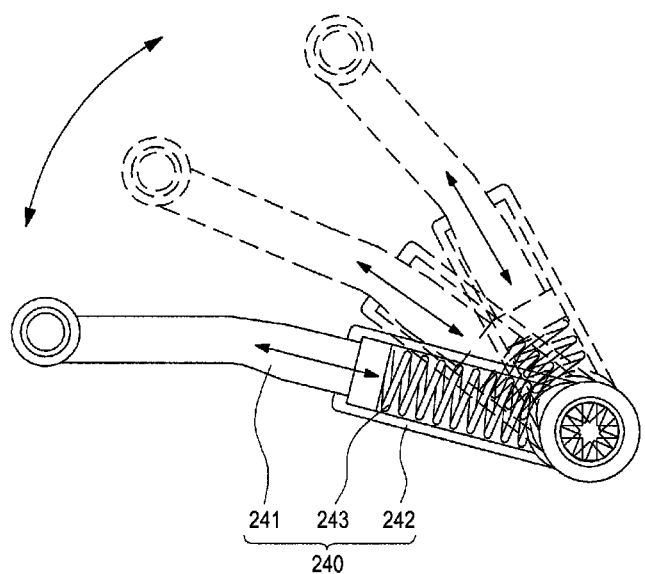
FIG. 20 is an enlarged side cross-sectional view showing another example of an auxiliary lever in a cradling apparatus for a portable communication device according to a second embodiment of the present invention.

Shown in FIGS. 19 and 20 is another example of the auxiliary lever 210 which is a variable auxiliary lever 240 which makes a variable movement to keep the first housing 110 and the second housing 120 facing each other.

As shown in FIG. 20, the variable auxiliary lever 240 includes a variable movement bar 241, a variable movement housing 242, and an elastic member 243. The variable movement bar 241 is rotatably coupled with the second housing 120 such that it makes a variable movement to keep the first housing 110 and the second housing 120 facing each other. The variable movement housing 242 is rotatably coupled with the first housing 110 to variable-movably couple the variable movement bar 241 thereto. The elastic member 243 is provided in the variable movement housing 242 to provide an elastic force for allowing a movement of the variable movement bar 241.

As shown in FIG. 19, in one end portions of the link portions 130 are formed the rotation holes 131 to be rotatably coupled with rotation coupling portions (not shown) provided in the second housing 120, and in another end portions thereof are formed the hinge coupling portions 132 which are coupled with rotation portions (not shown) provided in hinge modules 193 and rotate together with the rotation portions.

The hinge modules 193 provide a force for allowing the second housing 120 to automatically slide and be inclinedly cradled while facing the first housing 110 when the second housing 120 slides by a predetermined distance, which is about 4-5 mm from the first housing 110.

Figure 14:
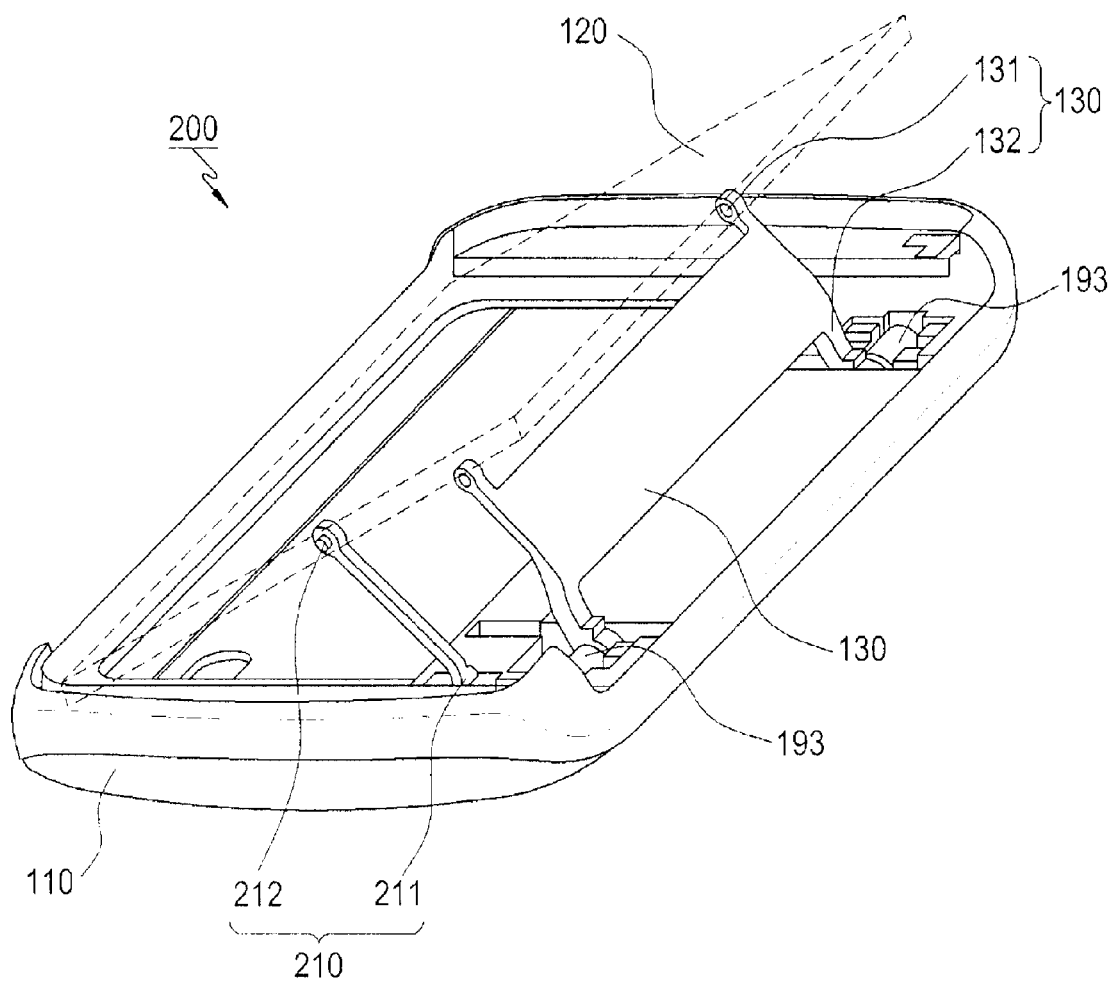
FIG. 14 is a perspective view of a cradling apparatus for a portable communication device according to a second embodiment of the present invention.

In this state, as shown in FIGS. 14 and 15, to slide and inclinedly cradle the second housing 120 while keeping the second housing 120 facing the first housing 110, the user first slides the second housing 120 by about 4-5 mm.

As shown in FIGS. 15 and 16, the auxiliary lever 210 also rotates, and the first rotation portion 211 and the second rotation portion 212 provided on the one end portion and another end portion of the auxiliary lever 210 rotate in the guide movement portion 220 and the first housing 110 in a coordinated way.

As shown in FIGS. 15 and 17, the guide movement portion 220 is oriented inclinedly during an initial stage of sliding of the second housing 120.

As shown in FIGS. 15 and 16, when the second housing 120 slides and is inclinedly cradled, the guide movement portion 220 maintains level and the second rotation portion 212 of the auxiliary lever 210 leaves from the hemispheric contact groove 221 formed in the end portion of the guide movement portion 220 and moves along the movement hole 222 of the guide movement portion 220, thus contacting the hemispheric contact groove 221 formed at another end portion of the guide movement portion 220.

In this state, the second rotation portion 212 of the auxiliary lever 210 may rotate and move in the guide movement portion 220 by means of the lever elastic member 230.

The first housing 110 and the second housing 120 are kept facing each other and prevent a space from being formed therebetween, thereby facilitating and improving sliding and cradling operations of the second housing 120.

In this state, the second housing 120 slides and is inclinedly cradled.

Figure 18:
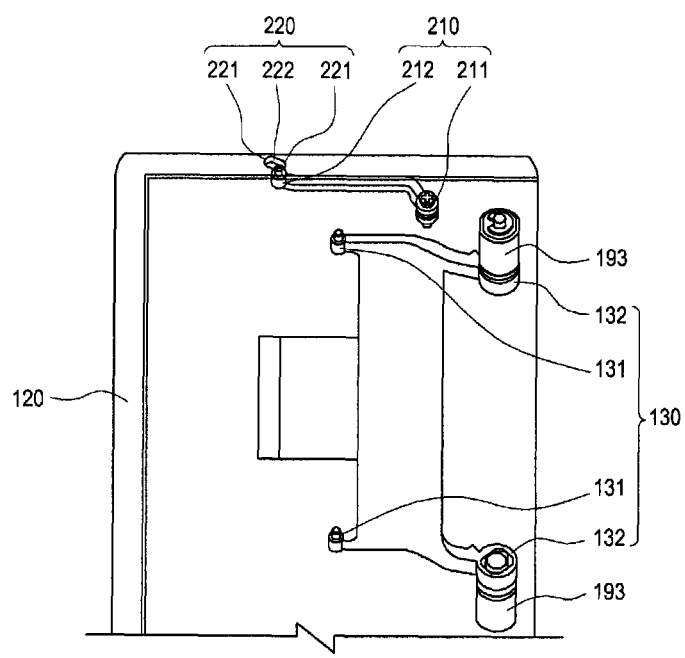
FIG. 18 is an internal perspective view of an auxiliary lever and a link portion in a cradling apparatus for a portable communication device according to a second embodiment of the present invention.

As shown in FIG. 18, the hinge modules 193 provided at another end portions of the link portions 130 provide a force for automatically sliding and inclinedly cradling the second housing 120 while keeping the second housing 120 facing the first housing 110 when the second housing 120 slides by about 4-5 mm.

The hinge modules 193 rotate the one end portions of the link portions 130 together with rotation of the link portions 130 to automatically slide and inclinedly cradle the second housing 120.

At this time, the guide movement portion 220 is oriented inclinedly when the second housing 120 is inclinedly cradled after sliding.

In this state, as shown in FIGS. 14 and 15, to turn the second housing 120 to the original position, the user rotates and slides the second housing 120 while keeping the second housing 120 facing the first housing 110.

Together with the second housing 120, the auxiliary lever 210 also rotates, thus being turned to the original position.

As shown in FIGS. 15 and 16, when the second housing 120 slides and is turned to the original position in the inclinedly oriented state of the guide movement portion 220, the guide movement portion 220 maintains level and the second rotation portion 212 of the auxiliary lever 210 leaves from the hemispheric contact groove 221 formed at the end portion of the guide movement portion 220 and moves along the movement hole 222 of the guide movement portion 220, thus contacting the hemispheric contact groove 221 formed at another end portion of the guide movement portion 220.

The first housing 110 and the second housing 120, when being turned to the original position, are kept facing each other and prevent a space from being formed therebetween, thereby facilitating and improving the sliding and cradling operations of the second housing 120.

The first housing 110 and the second housing 120 close the open/closed region of the first housing 110.

Shown in FIGS. 19 and 20 is another example of the auxiliary lever 210 which is the variable auxiliary lever 240 which makes variable movement to keep the first housing 110 and the second housing 120 facing each other.

The variable auxiliary lever 240 includes the variable movement bar 241, the variable movement housing 242, and the elastic member 243.

In this state, as shown in FIG. 19, to slide and inclinedly cradle the second housing 120 while keeping the second housing 120 facing the first housing 110, the user first slides the second housing 120 by about 4-5 mm.

The variable auxiliary lever 240, together with the second housing 120, also slides and is inclinedly cradled.

In this state, as shown in FIGS. 19 and 20, the variable movement bar 241 variably moves in and is inserted into the variable movement housing 242 when the second housing 120 slides and is inclinedly cradled. The variable movement bar 241 is pressurized by the elastic member 243 to keep the first housing 110 and the second housing 120 facing each other.

As shown in FIG. 20, when the second housing 120 is inclinedly cradled after sliding, the variable movement bar 241 variably moves by an elastic force of the elastic member 243 in the variable movement housing 242, thus being ejected.

The variable movement bar 241 is rotatably coupled to the second housing 120, and the variable movement housing 242 is rotatably coupled with the first housing 110.

In this state, the first housing 110 and the second housing 120 are kept facing each other and prevent a space from being formed between therebetween, thus facilitating and improving the sliding and cradling operations of the second housing 120.

As shown in FIGS. 19 and 20, to turn the second housing 120 to the original position in this state, the user rotates and slides the second housing 120 while keeping the second housing 120 facing the first housing 110.

As shown in FIG. 20, the variable movement bar 241 variably moves in and is inserted into the variable movement housing 242 when the second housing 120 slides and is inclinedly cradled.

At this time, as shown in FIGS. 19 and 20, the variable movement bar 241 is pressurized by the elastic member 243 to keep the first housing 110 and the second housing 120 facing each other.

As shown in FIG. 20, when the second housing 120 is turned to the original position, the variable movement bar 241 variably moves by an elastic force of the elastic member 243 in the variable movement housing 242, thus being ejected. In this state, the second housing 120 closes the open/closed region of the first housing 110, and the first housing 110 and the second housing 120 face each other.

In this state, the first housing 110 and the second housing 120, when being turned to the original position, are kept facing each other and prevent a space from being formed therebetween, thereby facilitating and improving the sliding and cradling operations of the second housing 120.

It will be obvious to those of ordinary skill in the art that the cradling apparatus for the portable communication device according to the present invention described above is not limited by the foregoing embodiments and drawings, and various substitutions, modifications, and changes can be made in various types of terminals, for example, a bar-type terminal, a sliding-type terminal, a swing-type terminal, and so forth.

What is claimed is:

1. A cradling apparatus for a portable communication device having a first housing, a second housing, and link portions provided between the first housing and the second housing to slide and inclinedly cradle the second housing, comprising:
    guide portions coupled to both ends of the first housing;
    guide members slidably coupled to an inside of the guide portions;
    hinge portions protruding from the guide members, the hinge portions being rotatably coupled to the second housing; and
    pressurizing portions provided on one end of each of the hinge portions to pressurize the hinge portions against the guide members,
    wherein the hinge portions further comprises bushes coupled with a hinge housing formed in the second housing and are rotatably coupled to the hinge portions, and further comprising one or more E-rings engaged with at least one end of each of the hinge portions to prevent separation of the bushes.

2. The cradling apparatus of claim 1, wherein the guide members surface-contact the guide portions.

3. The cradling apparatus of claim 1, further comprising sitting portions formed at both ends of the first housing for housing the guide portions thereon.

4. The cradling apparatus of claim 1, wherein the guide portions comprise guide rails on which are formed at least one screw-engagement portions screw-engaged with the first housing.

5. The cradling apparatus of claim 1, further comprising protection cover portions over the guide portions for protection.

6. The cradling apparatus of claim 1, wherein the guide members are of a long bar type, both end portions of the guide members are in a hemispheric shape; and surface-contact portions are formed in center portions of the guide members.

7. The cradling apparatus of claim 1, wherein the pressurizing portions comprise coil springs.

8. The cradling apparatus of claim 1, wherein rotation holes are formed at one end portion of each of the link portions to be rotatably coupled with rotation coupling portions provided in the second housing, and hinge coupling portions formed at another end portions of the link portions coupled with rotation portions provided in hinge modules and rotate together with the rotation portions.

9. The cradling apparatus of claim 8, wherein the hinge modules provide a force for automatically sliding and inclinedly cradling the second housing when the second housing slides by a predetermined distance.

10. The cradling apparatus of claim 9, wherein the predetermined distance is in between 4-5 mm inclusive from the first housing.

* * * * *